US010358070B2

(12) United States Patent
Diefenthaler et al.

(10) Patent No.: US 10,358,070 B2
(45) Date of Patent: Jul. 23, 2019

(54) ADJUSTABLE HEAD RESTRAINT ASSEMBLY FOR VEHICLE SEATS (71) Applicant: Lear Corporation, Southfield, MI (US)

(72) Inventors: Florian Diefenthaler, Oberding-Schwaig (DE); Stefan Brunner, Freising (DE); Thomas Peklo, Oberding-Schwaig (DE)

(73) Assignee: Lear Corporation, Southfield, MI (US)

( * ) Notice: Subject to any disclaimer, the term of this patent is extended or adjusted under 35 U.S.C. 154(b) by 184 days.

(21) Appl. No.: 15/439,080

(22) Filed: Feb. 22, 2017

(65) Prior Publication Data
US 2017/0334327 A1    Nov. 23, 2017

(30) Foreign Application Priority Data

May 18, 2016   (DE) .................. 10 2016 208 533

(51) Int. Cl.
*A47C 1/10*    (2006.01)
*B60N 2/812*   (2018.01)
*B60N 2/894*   (2018.01)
*B60N 2/897*   (2018.01)

(52) U.S. Cl.
CPC ............ *B60N 2/812* (2018.02); *B60N 2/894* (2018.02); *B60N 2/897* (2018.02)

(58) Field of Classification Search
CPC ........ B60N 2/812; B60N 2/894; B60N 2/897; B60N 2/806; B60N 2/02; B60N 2/80; B60N 2/815; B60N 2/818; B60N 2/0228
USPC .... 297/410, 404, 216.1, 391, 403, 401, 400, 297/216.12
See application file for complete search history.

(56) References Cited

U.S. PATENT DOCUMENTS

| 3,572,831 A | 3/1971 | Barecki |
| 7,316,455 B2 | 1/2008 | Metz et al. |
| 7,562,936 B1 | 7/2009 | Veine et al. |

(Continued)

FOREIGN PATENT DOCUMENTS

| DE | 29613073 U1 | 9/1996 |
| DE | 19630473 A1 | 1/1998 |

(Continued)

OTHER PUBLICATIONS

German Office Action for Application No. 10 2016 205 533.6, dated May 17, 2017, 7 pages.

*Primary Examiner* — Chi Q Nguyen
(74) *Attorney, Agent, or Firm* — Brooks Kushman P.C.

(57) ABSTRACT

A head restraint assembly is provided with a head restraint frame mounted to a post for movement along the post for adjustment relative to a vehicle seat. The head restraint frame has a contact surface. A biasing member is mounted to the head restraint frame for movement relative to the head restraint frame to maintain the head restraint frame in a locked condition along the post. An actuation member is mounted to the head restraint frame for movement relative to the head restraint frame. The actuation member cooperates with the biasing member such that movement of the actuation member moves the biasing member, thereby disengaging the biasing member from the post to permit movement of the head restraint along the post such that the biasing member engages the contact surface in the second position to provide feedback to the user of an unlocked condition of the head restraint frame.

20 Claims, 5 Drawing Sheets (56) References Cited

U.S. PATENT DOCUMENTS

| | | | |
|---|---|---|---|
| 8,376,465 B2 | 2/2013 | Veine et al. | |
| 8,573,703 B2 | 11/2013 | Poehlmann et al. | |
| 8,789,888 B2 | 7/2014 | Tscherbner et al. | |
| 8,794,705 B2 * | 8/2014 | Steinmetz | B60N 2/815 297/410 |
| 8,833,860 B2 * | 9/2014 | Fey | B60N 2/815 297/408 |
| 9,004,602 B2 | 4/2015 | Gottwald et al. | |
| 2006/0186720 A1 * | 8/2006 | Linardi | B60N 2/821 297/410 |
| 2006/0214491 A1 * | 9/2006 | Metz | B60N 2/815 297/410 |
| 2010/0270842 A1 * | 10/2010 | Mueller | B60N 2/865 297/410 |
| 2011/0006578 A1 * | 1/2011 | Veine | B60N 2/818 297/410 |
| 2012/0080923 A1 * | 4/2012 | Kunert | B60N 2/815 297/391 |
| 2015/0123445 A1 | 5/2015 | Mueller et al. | |

FOREIGN PATENT DOCUMENTS

| | | |
|---|---|---|
| DE | 102009033425 A1 | 3/2010 |
| FR | 3010951 A1 | 3/2015 |

* cited by examiner

ADJUSTABLE HEAD RESTRAINT ASSEMBLY FOR VEHICLE SEATS

CROSS-REFERENCE TO RELATED APPLICATIONS

This application claims foreign priority benefits under 35 U.S.C. § 119(a)-(d) to DE 10 2016 208 533.6, filed May 18, 2016, the disclosure of which ise hereby incorporated by reference in their entirety.

TECHNICAL FIELD

Various embodiments relate to adjustable head restraint assemblies for vehicle seats.

BACKGROUND

An adjustable head restraint assembly is illustrated and described in Veine et al. U.S. Pat. No. 7,562,936 B1.

SUMMARY

According to one embodiment, a head restraint assembly is provided with a head restraint frame having a first guide to be mounted to at least one post for movement relative to the at least one post. The head restraint frame has a second guide formed therein intersecting the first guide. An elongate spring wire is received within the second guide for movement relative to the head restraint frame. The elongate spring wire extends into the first guide to maintain the head restraint frame in a locked condition relative to the at least one post. Movement of the elongate spring wire from a first position corresponding to the locked condition of the head restraint frame to a second position corresponding to an unlocked condition of the head restraint frame, disengages the elongate spring wire from the at least one post to permit movement of the head restraint frame relative to the at least one post. The second guide is sized to receive the elongate spring wire for assembly of the elongate spring wire by translation of the elongate spring wire through the second guide only.

According to at least another embodiment, a seat assembly is provided with a seat bottom and a seat back adapted to extend from the seat bottom. A head restraint assembly is adapted to be mounted adjacent to the seat back. The head restraint assembly is provided with a head restraint frame having a first guide to be mounted to at least one post for movement relative to the at least one post. The head restraint frame has a second guide formed therein intersecting the first guide. An elongate spring wire is received within the second guide for movement relative to the head restraint frame. The elongate spring wire extends into the first guide to maintain the head restraint frame in a locked condition relative to the at least one post. Movement of the elongate spring wire from a first position corresponding to the locked condition of the head restraint frame to a second position corresponding to an unlocked condition of the head restraint frame, disengages the elongate spring wire from the at least one post to permit movement of the head restraint frame relative to the at least one post. The second guide is sized to receive the elongate spring wire for assembly of the elongate spring wire by translation of the elongate spring wire through the second guide only. A head restraint is mounted to at least one of the head restraint frame and the at least one post.

According to another embodiment, a head restraint assembly is provided with a head restraint frame having a first guide to be mounted to at least one post for movement relative to the at least one post. The head restraint frame has a second guide formed therein intersecting the first guide. An elongate spring wire is received within the second guide for movement relative to the head restraint frame. The elongate spring wire extends into the first guide to maintain the head restraint frame in a locked condition relative to the at least one post. Movement of the elongate spring wire from a first position corresponding to the locked condition of the head restraint frame to a second position corresponding to an unlocked condition of the head restraint frame, disengages the elongate spring wire from the at least one post to permit movement of the head restraint frame relative to the at least one post. The elongate spring wire is generally linear, deformed and preloaded in the first position. The elongate spring wire is generally non-linear in the second position, and generally non-linear in an unloaded condition.

According to at least another embodiment, a seat assembly is provided with a seat bottom and a seat back adapted to extend from the seat bottom. A head restraint assembly is adapted to be mounted adjacent to the seat back. The head restraint assembly is provided with a head restraint frame having a first guide to be mounted to at least one post for movement relative to the at least one post. The head restraint frame has a second guide formed therein intersecting the first guide. An elongate spring wire is received within the second guide for movement relative to the head restraint frame. The elongate spring wire extends into the first guide to maintain the head restraint frame in a locked condition relative to the at least one post. Movement of the elongate spring wire from a first position corresponding to the locked condition of the head restraint frame to a second position corresponding to an unlocked condition of the head restraint frame, disengages the elongate spring wire from the at least one post to permit movement of the head restraint frame relative to the at least one post. The elongate spring wire is generally linear, deformed and preloaded in the first position. The elongate spring wire is generally non-linear in the second position, and generally non-linear in an unloaded condition. A head restraint is mounted to at least one of the head restraint frame and the at least one post.

According to at least one embodiment, a head restraint assembly is provided with at least one post having a notch formed therein. A head restraint frame has a first guide to be mounted to the at least one post for movement relative to the at least one post. The head restraint frame has a second guide formed therein intersecting the first guide at an acute angle relative to the notch of the at least one post. A biasing member is received within the second guide for movement relative to the head restraint frame. The biasing member extends into the notch to maintain the head restraint frame in a locked condition relative to the at least one post. Movement of the biasing member from a first position corresponding to the locked condition of the head restraint frame to a second position corresponding to an unlocked condition of the head restraint frame, disengages the biasing member from the at least one post to permit movement of the head restraint frame relative to the at least one post. The acute angle of the notch relative to the second guide directs the biasing member into engagement with the notch.

According to at least another embodiment, a seat assembly is provided with a seat bottom and a seat back adapted to extend from the seat bottom. A head restraint assembly is adapted to be mounted adjacent to the seat back. The head restraint assembly is provided with at least one post having a notch formed therein. A head restraint frame has a first guide to be mounted to the at least one post for movement relative to the at least one post. The head restraint frame has a second guide formed therein intersecting the first guide at an acute angle relative to the notch of the at least one post. A biasing member is received within the second guide for movement relative to the head restraint frame. The biasing member extends into the notch to maintain the head restraint frame in a locked condition relative to the at least one post. Movement of the biasing member from a first position corresponding to the locked condition of the head restraint frame to a second position corresponding to an unlocked condition of the head restraint frame, disengages the biasing member from the at least one post to permit movement of the head restraint frame relative to the at least one post. The acute angle of the notch relative to the second guide directs the biasing member into engagement with the notch. A head restraint is mounted to at least one of the head restraint frame and the at least one post.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
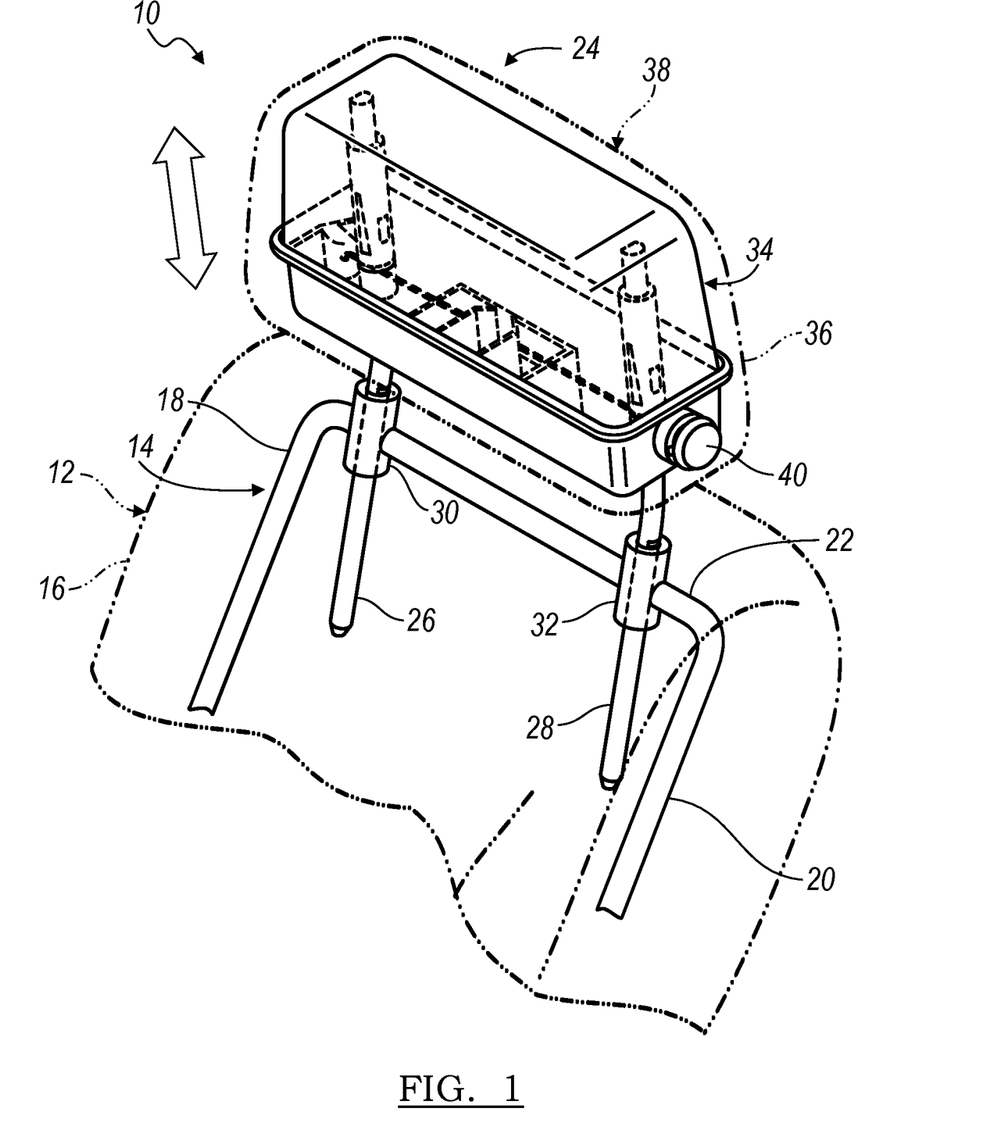
FIG. 1 is a fragmentary perspective view of an adjustable head restraint assembly according to an embodiment, illustrated mounted to a vehicle seat.

With reference now to FIG. 1, a seat is partially illustrated and referenced generally by numeral 10, which may be a vehicle seat assembly 10 for use in a vehicle, such as an automobile, a boat or an aircraft. The seat assembly 10 includes a seat bottom (not shown) that is mounted within the vehicle. The seat assembly 10 also includes a seat back 12 that is mounted to one of the seat bottom or the vehicle. The seat back 12 is illustrated with cushioning and a cover 16 in phantom for revealing a frame 14.

The vehicle seat assembly 10 may be provided anywhere within an associated vehicle, such as a front row seat, an intermediate row seat, a rear row seat, or the like. The seat bottom may be mounted directly to the vehicle floor or coupled to seat adjuster mechanisms or rails extending longitudinally to the vehicle floor and enabling longitudinal, height, and angular adjustment of the seat bottom relative to the vehicle floor. The seat bottom is conventional in design and can be constructed in accordance with any suitable manner; including a structural frame covered by a foam pad layer and other finished cover material.

The frame 14 is formed from any suitable material that is sufficiently light in weight, yet structurally sound for supporting the occupant and for withstanding appropriate testing requirements. The frame 14 includes a pair of side members 18, 20, which are connected by an upper cross member 22. In the description, various embodiments and operating parameters and components of the embodiments are described with directional language such as "left", "right", "above", "below", "upper", "lower", and words of similar import to designate direction shown in the drawings or are understood in the field of the art. Such directional terminology is used for relative description and clarity, and is not intended to limit the orientation of any embodiment or component of an embodiment to a particular direction or orientation.

The frame members 18, 20, 22 can be formed integrally or from separate components that are joined by any suitable manner, such as welding, stamping, fastening or the like to form the frame 14. The frame 14 is subsequently covered with foam or cushioning and the cover material 16 to support the occupant.

A head restraint assembly 24 is provided in the vehicle proximate to the seat back 12 for supporting a head of the occupant. In the embodiment depicted, the head restraint assembly 24 includes a pair of posts 26, 28 that are secured to the frame 14. The posts 26, 28 may each be received in a corresponding sleeve 30, 32 that is mounted to the upper cross member 22 of the frame 14. The posts 26, 28 may be secured to the sleeve 30, 32, by a suitable fastener such as a retaining ring. Although the posts 26, 28 are illustrated mounted to the frame 14, the invention contemplates that the posts 26, 28 may be secured to any structure of the vehicle body for orienting the head restraint assembly 24 proximate to the seat back 12. For example, the head restraint assembly 24 may be secured to the seat back 12 for various seating arrangements such as front row seating, intermediate seating, and rear row seating. However, in certain seating arrangements the head restraint assembly 24 may be mounted directly to the vehicle body, such as a rear row seating that is adjacent to a cargo compartment, or single row seating vehicles. Alternatively, the pair of posts may be formed continuous from a unitary post that is bent to satisfy the geometries afforded by a discrete pair of posts; or from a weldment including a pair of posts and a cross member.

The head restraint assembly 24 includes a first frame portion 34 mounted to the posts 26, 28 for adjustment relative to the seat back 12. In the embodiment depicted, the adjustment is provided in an upright direction as illustrated by the linear arrow in FIG. 1, thereby providing a height adjustment of the first frame portion 34 relative to the seat back 12. Alternatively, the adjustment could be utilized in another direction, such as a fore/aft direction within the vehicle by extending the posts 26, 28 in a fore/aft direction.

A second frame portion may be provided for engagement with the first frame portion 34 and for enclosing the first frame portion 34. Cushioning or foam padding is provided about the first frame portion 34 with a trim cover 36 enclosing the head restraint assembly 24. The first frame portion 34, padding and cover 36 provide a head restraint 38 that is adjustable relative to the posts 26, 28.

In at least one embodiment, a push button 40 is provided on a lateral side of the first frame portion 34 for cooperating with a locking mechanism for securing the first frame portion 34 and consequently the head restraint 38 to multiple positions along the posts 26, 28. The push button 40 extends external of the trim cover 36 for actuation by the user. Alternatively, the push button 40 may be retained within the trim cover 36, and a designation of the location of the push button 40 may be provided externally on the trim cover 36. As yet another alternative, the posts 26, 28 may be moveable relative to the seat back frame 14, and the locking mechanism may be provided on the seat back frame 14 for adjusting the posts 26, 28 and the head restraint 38 relative to the seat back frame 14.

Figure 2:
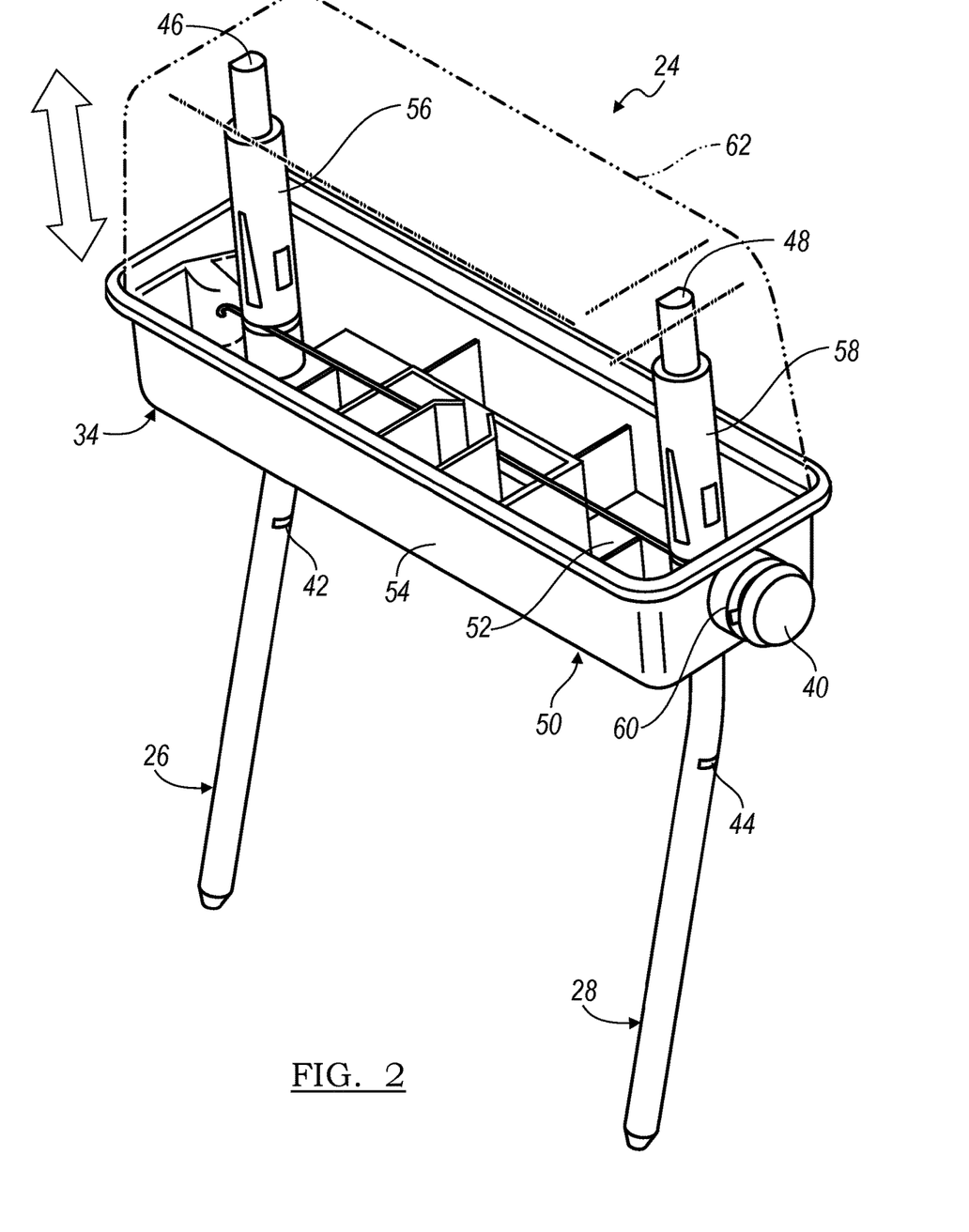
FIG. 2 is an enlarged fragmentary perspective view of the adjustable head restraint assembly of FIG. 1.

Referring now to FIG. 2, the adjustable head restraint assembly 24 is illustrated in greater detail. Each of the posts 26, 28 is illustrated with a notch 42, 44 for cooperating with a fastener, such as a retaining ring for securing the posts 26, 28 to the frame 14. Each of the posts 26, 28 includes a generally upright portion 46, 48. The head restraint first frame portion 34 is mounted to the upright portions 46, 48 of the posts 26, 28 for movement along the upright portions 46, 48 for adjustment of the head restraint 38 relative to the posts 26, 28.

The head restraint first frame portion 34 provides a base 52. A pair of sleeves 56, 58 is provided by the base 52, each for receiving one of the upright portions 46, 48 of one of the posts 26, 28. The first frame portion 34 is formed integrally from a material having adequate structural characteristics, yet being light in weight, as a high strength polymer, such as high density polyethylene (HDPE) or any suitable material, such as a material which may be formed by injection molding. The first frame portion 34 also includes a transverse guide 60, which receives the push button 40 and permits translation of the push button 40 relative to the first frame portion 34.

The head restraint assembly 24 also includes a cover 62 that cooperates with the sidewalls 54 of the lower housing portion 50 for enclosing the upright portions 46, 48 of the posts 26, 28 and the sleeves 56, 58 of the lower housing portion 50. The cover 62 also encloses the locking mechanism therein, which permits the adjustment of the head restraint 38. The cover 62 may also be formed from a high strength polymer such as HDPE, and may be injection molded with a series of structural ribs therein for providing added structural support to the first frame portion 34. The cover 62 may be formed as one component as depicted, or alternatively as multiple components, such as a pair of shell halves for mating to enclose the upright portions 46, 48 of the posts 26, 28, while also mating with the lower housing portion 50. Foam padding is subsequently provided about the frame portions 34, 62 for providing comfort to the occupant. The trim cover 36 is provided about the foam padding for enclosing the padding, and the first frame portion 34.

Figure 3:
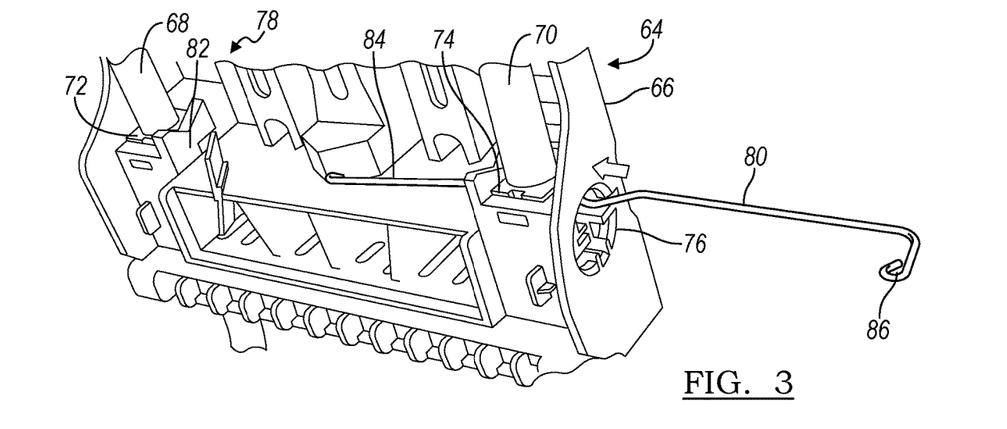
FIG. 3 is a fragmentary perspective view of an adjustable head restraint assembly according to another embodiment, illustrated during assembly.
Figure 4:
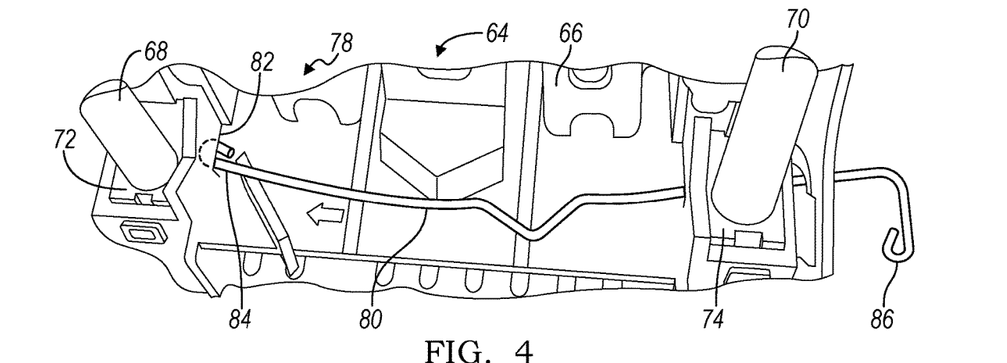
FIG. 4 is a fragmentary perspective view of the adjustable head restraint assembly of FIG. 3, illustrated during further assembly.
Figure 5:
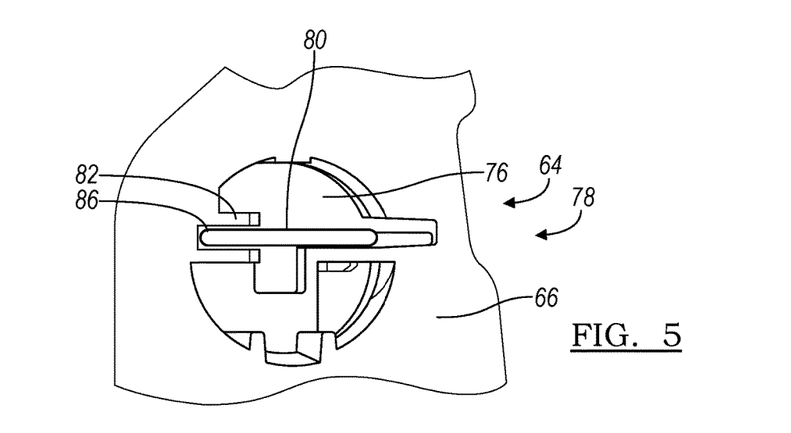
FIG. 5 is a fragmentary side view of the adjustable head restraint assembly of FIG. 3.

FIGS. 3-5 illustrate an adjustable head restraint assembly 64 according to another embodiment. The head restraint assembly 64 includes a frame 66 mounted to a pair of posts 68, 70, similar to the prior embodiment. A pair of sleeves 72, 74 is provided in the frame 66 to contact the posts 68, 70 and to provide guides for the head restraint assembly 64 along the posts 68, 70. A first transverse guide 76 is provided in a lateral side of the frame 66 to receive a push button assembly to actuate a locking mechanism 78. The locking mechanism 78 includes a biasing member, such as an elongate spring wire 80.

A second transverse guide 82 is formed in the frame 66 and intersects both of the sleeves 72, 74 to receive the spring wire 80. As will be explained below, the spring wire 80 cooperates with the posts 68, 70 to lock the head restraint assembly 64 to the posts 68, 70. The second transverse guide 82 is also formed through the first transverse guide 76 to provide access to the second transverse guide 82.

The elongate spring wire 80 is assembled to the locking mechanism 78 by inserting a first end 84 of the spring wire 80 through the first transverse guide 76 and into the second transverse guide 82 as illustrated in FIG. 3. The spring wire 80 is further translated laterally such that the spring wire first end 84 engages the sleeve 72 and post 68 as depicted in FIG. 4. The spring wire 80 is further translated laterally until a second end 86 of the spring wire 80 is seated in the second transverse guide 82 as illustrated in FIG. 5. Then, the push button assembly (40, FIGS. 1 and 2) is installed in the first transverse guide 76 to retain the spring wire 80 in the assembled head restraint assembly 64.

The assembly method of the locking mechanism 78 is limited to lateral translation of the spring wire 80 only. This assembly method is an improvement over prior art assembly methods wherein the first and second ends of the spring wire are each inserted into the respective sleeves from a central region of the prior art head restraint assembly. Such prior art assembly methods require multiple steps, including translation in both lateral directions, as well as bending of the prior art spring wire while lifting intermediate regions of the spring wire over portions of the transverse guide and associated ramps. The assembly method of FIGS. 3-5 reduces many assembly steps and also provides detection of a properly installed spring wire 80 within the second transverse guide 82.

Figure 6:
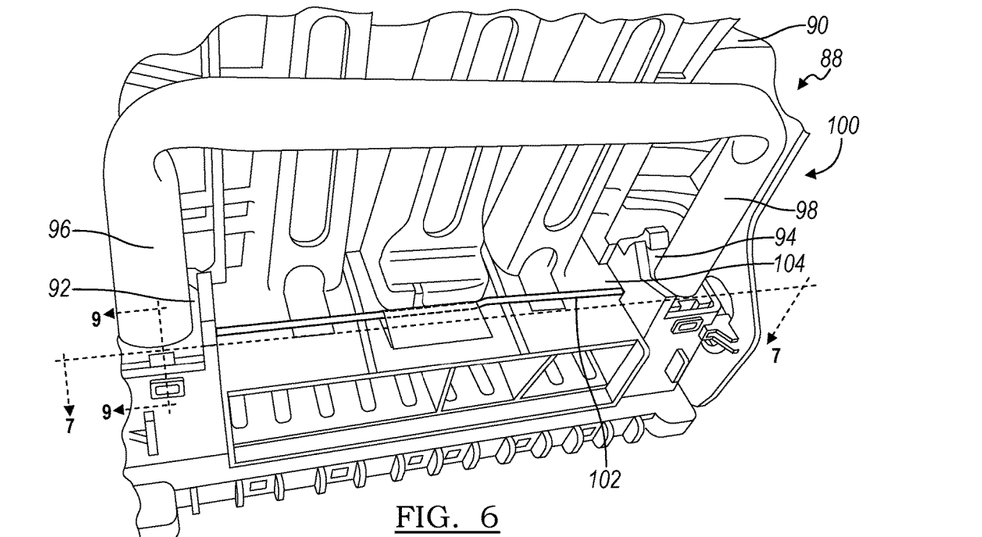
FIG. 6 is a fragmentary perspective view of an adjustable head restraint assembly according to another embodiment.
Figure 7:
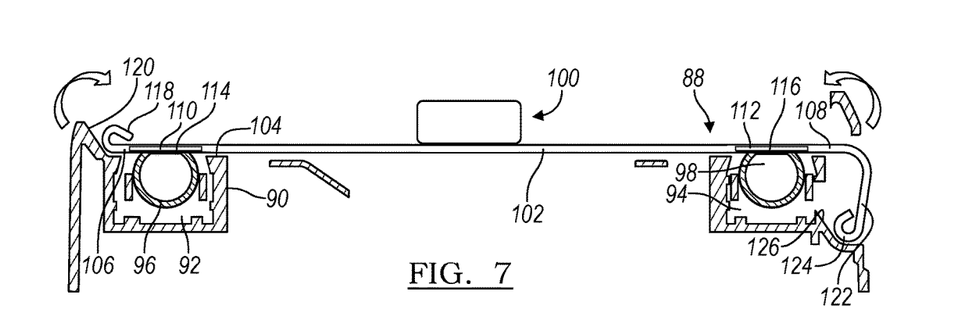
FIG. 7 is a section view of the head restraint assembly of FIG. 6 taken along section line 7-7 in FIG. 6.

FIGS. 6 and 7 illustrate another adjustable head restraint assembly 88, according to an embodiment. The head restraint assembly 88 includes a frame 90 with a pair of sleeves 92, 94 in receipt of a pair of posts 96, 98. A locking mechanism 100 includes a spring wire 102 within a transverse guide 104 that extends through the sleeves 92, 94 to engage the posts 96, 98. The spring wire 102 has a first end 106 at one lateral end of the frame 90, and a second end 108 that extends to the other lateral end of the frame 90. Each of the sleeves 92, 94 includes a recess 110, 112 formed therein for providing access for the spring wire 102 to the corresponding portion of the posts 96, 98. In the locked position, the spring wire 102 extends into recesses 110, 112 thereby engaging the posts 96, 98 and locking the head restraint assembly 88 to an adjusted position upon the posts 96, 98.

As is known in the art, the posts 96, 98 may include a series of incremental notches 114, 116 formed therein and aligned with the recesses 110, 112 so that the spring wire 102 may extend into the notches 114, 116 at each incremental height position for securely locking the head restraint assembly 88 at the desired position.

Referring again to FIG. 2, the push button assembly 40 extends through a sidewall 54 of the first frame portion 34 to engage the second end 108 of the spring wire 102. Actuation of the push button 40 by introduction of an external force, consequently actuates the spring wire 102 to translate to the left in FIG. 7 thereby deforming the spring wire 102 by bending the spring wire 102 in the direction of the arcuate arrows, and thereby disengaging the spring wire 102 from the posts 96, 98 for unlocking the head restraint assembly 88 and for adjusting the height of the head restraint assembly 88.

Referring again to FIG. 7, the locking mechanism 100 is illustrated in the locked position. The first end 106 of the spring wire 102 includes a leading surface 118 formed by a curve in the spring wire 102. The frame 90 includes a first ramp 120 that is oriented within the path of travel of the leading surface 118 of the spring wire first end 106. Upon actuation of the push button 40 and consequently the spring wire 102, the leading surface 118 engages the first ramp 120, thereby causing the spring wire 102 to flex as the first end 106 is urged away, and out of engagement with the post 96.

The second end 108 of the spring wire 102 includes a transverse portion 122 that engages the push button 40. Thus, actuation of the push button 40 actuates the transverse portion 122 of the spring wire 102. A leading surface 124 is provided on the transverse portion 122. A second ramp 126 is provided within the frame 90 within the path of movement of the leading surface 124 of the transverse portion 122. Thus, as the push button 40 and the transverse portion 122 of the spring wire 102 are translated to an unlocked position, the leading surface 124 of the transverse portion 122 engages the second ramp 126 thereby urging the spring wire 102 away from and out of engagement with the post 98.

In the unlocked position, the leading surface 118 of the first end 106 of the spring wire 102 has engaged the first ramp 120 and thereby urges the spring wire 102 out of engagement, and consequently out of the notch 114 of the post 96. Likewise, the leading surface 124 of the transverse portion 122 of the second end 108 of the spring wire 102 has engaged the second ramp 126 thereby urging the spring wire 102 out of engagement with the post 98. In this unlocked position, the spring wire 102 is no longer engaging the posts 96, 98 and therefore the spring wire 102 is disengaged from the corresponding notches 114, 116 thereby permitting the user to adjust the height of the head restraint assembly 88.

Since the spring wire 102 is bent into the unlocked position, the spring wire 102 provides a resultant return force upon the first ramp 124 and the second ramp 126. Upon removal of an external force upon the push button 40, the spring wire 102 expands lengthwise thereby providing the return force against the first ramp 124 and the second ramp 126 for returning the spring wire 102 to the locked position of FIG. 7.

In order to minimize summations of tolerances and resultant increasing resultant forces, only two ramps, the first ramp 124 and the second ramp 126 are employed in the head restraint assembly 88. The first ramp 124 and the second ramp 126 are further inclined to provide the targeted displacement without requiring a third ramp, which may ultimately increase the force required to unlock the locking mechanism 100. Without a third ramp, the spring wire 102 is simpler in geometry and consequently easier to assemble.

FIGS. 6 and 7 illustrate that the spring wire 102 is generally linear from the first end 106 to the second end 108 in the locked position. The flexing of the first end 106 and the second end 108 is further assisted by a fulcrum in the transverse guide 104.

Figure 8:
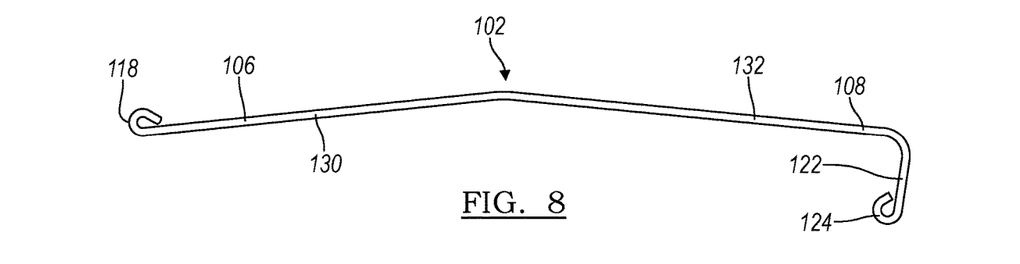
FIG. 8 is a top plan view of a biasing member of the adjustable head restraint assembly of FIG. 6.

FIG. 8 illustrates the spring wire 102 in a free, unloaded position. The spring wire 102 includes a first linear portion 130 and a second linear portion 132 that are not collinear. Therefore, once assembled, the spring wire 102 is deformed into a generally linear orientation, thereby preloading the locking mechanism 100. According to an alternative embodiment, the spring wire 102 is linear in a free, unloaded position; and the first ramp 124 and the second ramp 126 are arranged such that the spring wire 102 is deformed and curved in the loaded, locked position. A central fulcrum may be employed to further guide the deformation and movements of the alternative spring wire 102.

A reduced depth of the notches 114, 116 in the posts 96, 98, in comparison to the prior art reduces a length of contact with the spring wire 102. The reduced length of contact may minimize deformation of the spring wire in the upright and downward direction.

Figure 9:
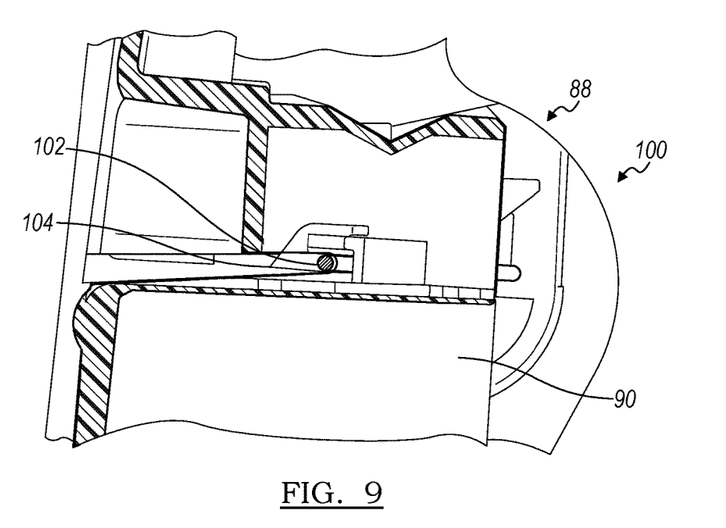
FIG. 9 is a section view of the head restraint assembly of FIG. 6 taken along section line 9-9 in FIG. 6.

There is a tolerance in the forming of the notches 114, 116 in the posts 96, 98. For example, the tolerance may be up to four degrees from horizontal. Such a tolerance may result in a slight decline in the notches 114, 116, which may lead to inadvertent unlocking of the locking mechanism, such as when an external force is placed upon the head restraint assembly 88. FIG. 9 illustrates that the transverse guide 104 is not horizontal to provide an acute angle between the transverse guide 104 and the notch 114 of the corresponding post 96.

Figure 10:
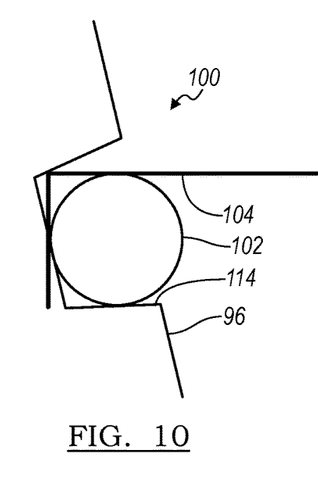
FIG. 10 is a schematic view of a locking mechanism of the head restraint assembly of FIG. 6.

The relationship of the transverse guide 104 and the notch 114 is illustrated schematically in FIG. 10. The tolerance of the notch 114 is exaggerated in FIG. 10 for emphasis. By forming the notch 114 and the transverse guide 104 at an acute angle to one another, a decline in the notch 114 is avoided to prevent a decline relative to the downward direction on the post 96. Such a decline may urge the spring wire 102 out of engagement from the notch 114. A slight offset of three to eight degrees from horizontal may compensate for the manufacturing tolerances to result in an acute angle of eighty-seven to eighty-two degrees, for example. Alternatively, the notch 114 may be machined, such as by a grinding operation, with upper and lower planes that are generally parallel to reduce or eliminate the tolerances described above.

Figure 11:
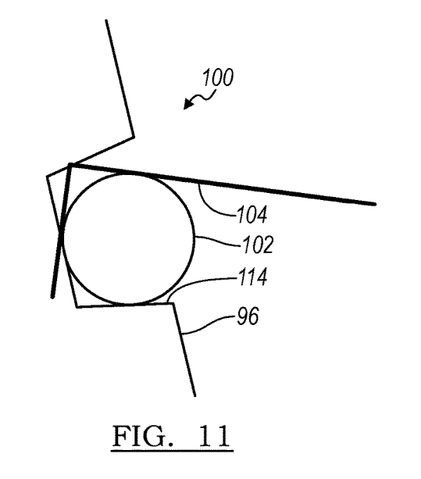
FIG. 11 is another schematic view of a locking mechanism of the head restraint assembly of FIG. 6.

FIG. 11 illustrates another schematic representation of the transverse guide 104 and the notch. In this example, the acute angle is further exaggerated, such as by designing the head restraint assembly 88 with the frame 90 further rotated relative to the post 96. In this arrangement, the spring wire 102 is further urged into the notch 114 by the weight of the frame 90 and supported components, and by any inadvertent downward contact.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint assembly comprising:
   a head restraint frame having a first guide to be mounted to at least one post for movement relative to the at least one post, the head restraint frame having a second guide formed therein intersecting the first guide; and
   an elongate spring wire received within the second guide for movement relative to the head restraint frame, the elongate spring wire extending into the first guide to maintain the head restraint frame in a locked condition relative to the at least one post, wherein movement of the elongate spring wire from a first position corresponding to the locked condition of the head restraint frame to a second position corresponding to an unlocked condition of the head restraint frame, disengages the elongate spring wire from the at least one post to permit movement of the head restraint frame relative to the at least one post, wherein the second guide is sized to receive the elongate spring wire for assembly of the elongate spring wire by translation of the elongate spring wire through the second guide only.

2. The head restraint assembly of claim 1 wherein the elongate spring wire is generally linear from a first end of the elongate spring wire to a second end of the elongate spring wire in the first position.

3. The head restraint assembly of claim 2 wherein the elongate spring wire is generally non-linear in the second position.

4. The head restraint assembly of claim 2 wherein the elongate spring wire is deformed and preloaded in the first position.

5. The head restraint assembly of claim 4 wherein the elongate spring wire is generally non-linear in an unloaded condition.

6. The head restraint assembly of claim 1 wherein the elongate spring wire comprises a first linear portion and a second linear portion that are formed at an angle relative to one another in an unloaded condition of the spring wire.

7. The head restraint assembly of claim 6 wherein the at least one post is further defined as a first post;
wherein the head restraint frame has a third guide generally parallel with the first guide to receive a second post for movement relative to the second post, the third guide intersecting the second guide; and
wherein the first linear portion and the second linear portion of the elongate spring wire are received within the second guide for movement relative to the head restraint frame, the first linear portion of the elongate spring wire extends into the first guide in the locked condition relative to the first post, the second linear portion of the elongate spring wire extends into the third guide in the locked condition relative to the second post, wherein movement of the elongate spring wire from the first position to the second position, disengages the first linear portion from the first post and the second linear portion from the second post to permit movement of the head restraint frame relative to the first post and the second post.

8. The head restraint assembly of claim 1 further comprising:
at least one post received in the first guide of the head restraint frame, the at least one post having a notch formed therein at an acute angle relative to the second guide to receive the elongate spring wire and to direct the elongate spring wire into engagement with the notch.

9. The head restraint assembly of claim 1 further comprising a head restraint mounted to at least one of the head restraint frame and the at least one post.

10. A seat assembly comprising:
a seat back; and
a head restraint assembly according to claim 9 adapted to be mounted adjacent to the seat back.

11. A head restraint assembly comprising:
a head restraint frame having a first guide to be mounted to at least one post for movement relative to the at least one post, the head restraint frame having a second guide formed therein intersecting the first guide; and
an elongate spring wire received within the second guide for movement relative to the head restraint frame, the elongate spring wire extending into the first guide to maintain the head restraint frame in a locked condition relative to the at least one post, wherein movement of the elongate spring wire from a first position corresponding to the locked condition of the head restraint frame to a second position corresponding to an unlocked condition of the head restraint frame, disengages the elongate spring wire from the at least one post to permit movement of the head restraint frame relative to the at least one post, wherein the elongate spring wire is generally linear from a first end of the elongate spring wire to a second end of the elongate spring wire, deformed and preloaded in the first position, generally non-linear in the second position, and generally non-linear in an unloaded condition.

12. The head restraint assembly of claim 11 wherein the elongate spring wire comprises a first linear portion and a second linear portion that are formed at an angle relative to one another in an unloaded condition of the spring wire.

13. The head restraint assembly of claim 12 wherein the at least one post is further defined as a first post;
wherein the head restraint frame has a third guide generally parallel with the first guide to receive a second post for movement relative to the second post, the third guide intersecting the second guide; and
wherein the first linear portion and the second linear portion of the elongate spring wire are received within the second guide for movement relative to the head restraint frame, the first linear portion of the elongate spring wire extends into the first guide in the locked condition relative to the first post, the second linear portion of the elongate spring wire extends into the third guide in the locked condition relative to the second post, wherein movement of the elongate spring wire from the first position to the second position, disengages the first linear portion from the first post and the second linear portion from the second post to permit movement of the head restraint frame relative to the first post and the second post.

14. The head restraint assembly of claim 11 further comprising a head restraint mounted to at least one of the head restraint frame and the at least one post.

15. A seat assembly comprising:
a seat back; and
a head restraint assembly according to claim 14 adapted to be mounted adjacent to the seat back.

16. A head restraint assembly comprising:
at least one post having a notch formed therein;
a head restraint frame having a first guide to be mounted to the at least one post for movement relative to the at least one post, the head restraint frame having a second guide formed therein intersecting the first guide at an acute angle relative to the notch of the at least one post; and
a biasing member received within the second guide for movement relative to the head restraint frame, the biasing member extending into the notch to maintain the head restraint frame in a locked condition relative to the at least one post, wherein movement of the biasing member from a first position corresponding to the locked condition of the head restraint frame to a second position corresponding to an unlocked condition of the head restraint frame, disengages the biasing member from the at least one post to permit movement of the head restraint frame relative to the at least one post, wherein the acute angle of the notch relative to the second guide directs the biasing member into engagement with the notch.

17. The head restraint assembly of claim 16 wherein the acute angle is eighty-seven degrees or less.

18. The head restraint assembly of claim 16 wherein the acute angle is within a range of eighty-two to eighty-seven degrees.

19. The head restraint assembly of claim 16 further comprising a head restraint mounted to at least one of the head restraint frame and the at least one post.

20. A seat assembly comprising:
   a seat back; and
   a head restraint assembly according to claim 19 adapted to be mounted adjacent to the seat back.

\* \* \* \* \*